US007839280B2

(12) United States Patent
Peters et al.

(10) Patent No.: US 7,839,280 B2
(45) Date of Patent: Nov. 23, 2010

(54) REMOTE SENSING DEVICE THAT STORES SENSOR TYPE AND MEASURING UNITS THEREOF IN MEMORY

(75) Inventors: Mark E. Peters, Hamilton, OH (US); Robert B. Fitzpatrick, Cincinnati, OH (US)

(73) Assignee: R3 Sensors, LLC, Orem, UT (US)

( * ) Notice: Subject to any disclaimer, the term of this patent is extended or adjusted under 35 U.S.C. 154(b) by 865 days.

(21) Appl. No.: 11/744,464

(22) Filed: May 4, 2007

(65) Prior Publication Data

US 2008/0272935 A1 Nov. 6, 2008

(51) Int. Cl.
*G08B 1/08* (2006.01)

(52) U.S. Cl. .............................. 340/539.22; 340/539.26; 702/1

(58) Field of Classification Search .............. 340/539.1, 340/539.16, 539.17, 539.22, 539.26, 540; 702/1
See application file for complete search history.

(56) References Cited

U.S. PATENT DOCUMENTS

| 6,721,546 | B1 * | 4/2004 | Compton ................... 455/91 |
| 2005/0275529 | A1 * | 12/2005 | Kates .................... 340/539.22 |

OTHER PUBLICATIONS

Wireless Dry Contact Monitor Product Specification, ControLink, brochure published prior to May 2007.
Wireless Proximity Sensor Product Specification, ControLink, brochure published perior to May 2007.
ValTrek Wireless Series Limit Switch Product Specification, ControLink, brochure published prior to May 2007.
EDL-RF, Marathon Products, Inc., brochure published prior to May 2007.
Agile-Link Wireless Data Acquisition System, MicroStrain, brochure published Apr. 16, 2007.
Point Six Wireless, brochure published prior to May 2007.

* cited by examiner

*Primary Examiner*—Jeffery Hofsass
(74) *Attorney, Agent, or Firm*—Jefferson IP Law, LLP; Raymond B. Persino (57) ABSTRACT

A remote wireless network includes a plurality of sensors/transmitters wherein each sensor is uniquely identifiable and lends its unique identity to the transmitter to which it is attached.

15 Claims, 12 Drawing Sheets

REMOTE SENSING DEVICE THAT STORES SENSOR TYPE AND MEASURING UNITS THEREOF IN MEMORY

BACKGROUND

The present invention relates to a remote sensing device. More particularly, it relates to remote wireless monitors designed to sense, collect, and transmit component performance information such as pressure, temperature, current, vibration, and humidity.

There are many wireless sensors on the market and they all do essentially the same thing. A sensor senses some parameter and assigns some quantity to it. This parameter may be a temperature or a pressure, for example. The sensor sends the assigned value to a transmitter in a digital or analog format using wires. This value is transmitted via radio frequency (RF) to a receiver. The receiver is usually part of the data collection system, so the data can be read and interpreted. The transmitter may or may not require external power, but it usually is battery powered. The receiver typically requires external power.

A sensor can be part of the transmitter package or it can be separate from the transmitter. When the sensor is integral to the transmitter, the identities of the sensor and its data cables are housed in the transmitter. The sensor is then a component of the transmitter. Changing the sensor does not change anything in the transmitter. In this instance, to change information in the transmitter, a manual configuration process is required, if it can be done at all.

In the case where the sensor is not part of the transmitter, the sensor is generic and has to be defined. The configuration is done either in the transmitter or in the receiver and is done manually.

In either case, the identity is attached to the transmitter, and a manual association is made between the sensor and the transmitter. The recipient of the signal must assume that, since the data was received from transmitter X, which is assumed to have a sensor Y attached to it, then the data from transmitter X must be type Y. The sensor has to communicate its information to the transmitter.

In essence, in prior art wireless sensors, the identity of the sensor is defined by the transmitter and/or the receiver. The identity may include a unique name, sensor type, and calibration curves. All of this information is manually configured and then managed. This manual configuration and management introduces the potential for error and is very labor intensive.

SUMMARY

An embodiment of the present invention provides a wireless sensor and transmitter assembly which uses a universal transmitter that is transparent, with the identity and data originating at the sensor. The transmitter automatically uses the serial number, device type, scaling, linearization, and identification information of the sensor to which it is attached. The data being transmitted by the transmitter is calculated and identified by the sensor itself.

DESCRIPTION

Figure 1:
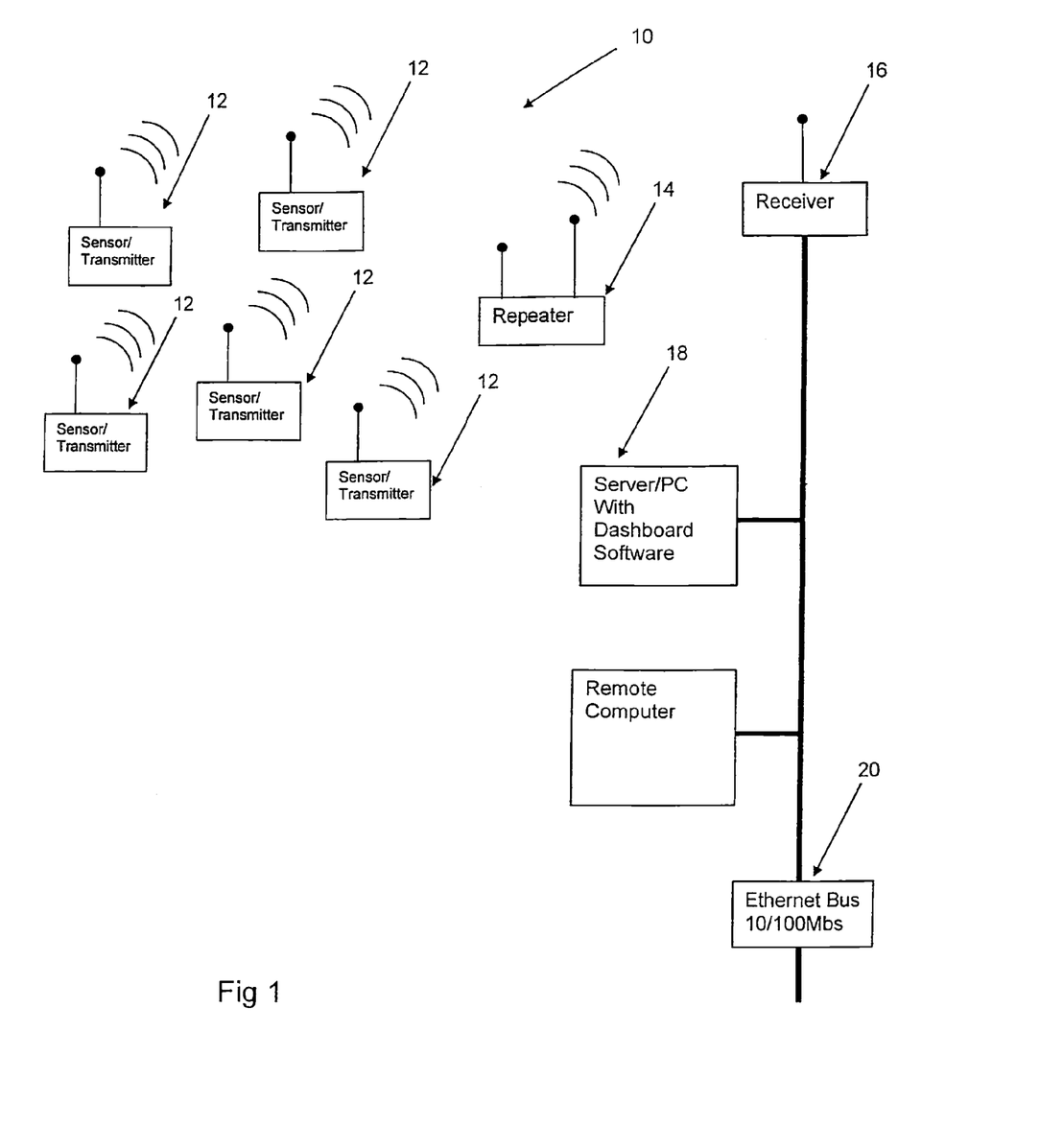
FIG. 1 is a schematic of a typical network of a wireless sensor monitoring system made in accordance with the present invention, including a plurality of wireless sensor/transmitters, a signal repeater, and a receiver connected to a server or a computer via an Ethernet Bus.

FIG. 1 shows a network 10 utilizing a plurality of sensor/transmitters 12 made in accordance with the present invention. The network 10 includes several sensor/transmitters 12, a repeater 14 (which is used when the location of the receiver 16 is beyond the transmission range of the sensor/transmitter 12), and a receiver 16, which is connected to a server or a computer 18 via an Ethernet Bus 20 or some other known means.

Figure 2:
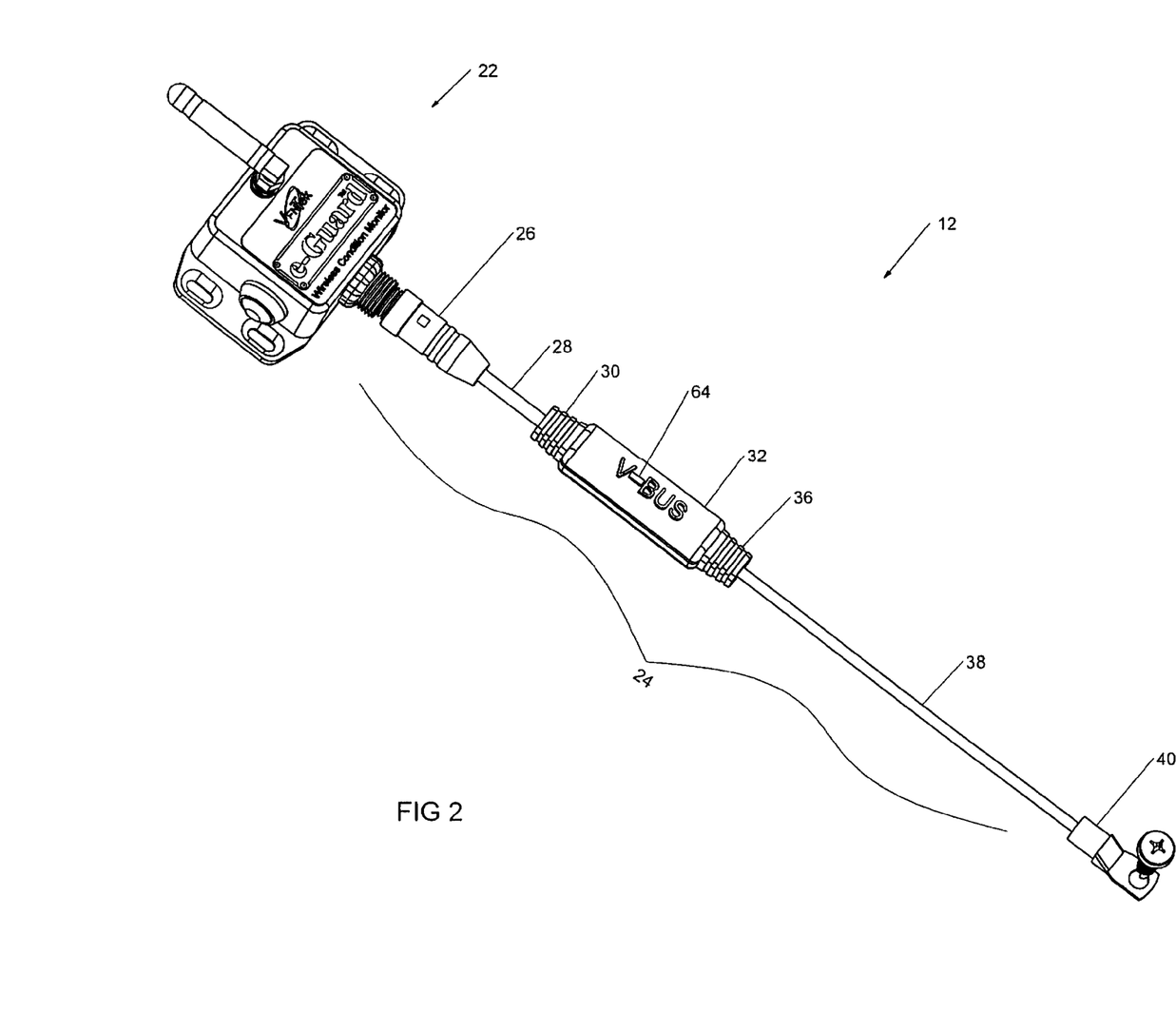
FIG. 2 is a perspective view of one of the wireless sensor/transmitters of FIG. 1.

FIG. 2 is a perspective view of one of the sensor/transmitters 12 used in the network of FIG. 1. This particular sensor/transmitter 12 includes a temperature sensor probe 40. Other sensor probes may be used, as described in more detail below. The sensor/transmitter 12 includes a radio frequency transmitter 22 and a sensor train 24 (which includes a sensor element 40, a memory element 32, an 8 pin connector 26, and connecting elements 28, 38, as described in more detail below).

Figure 3:
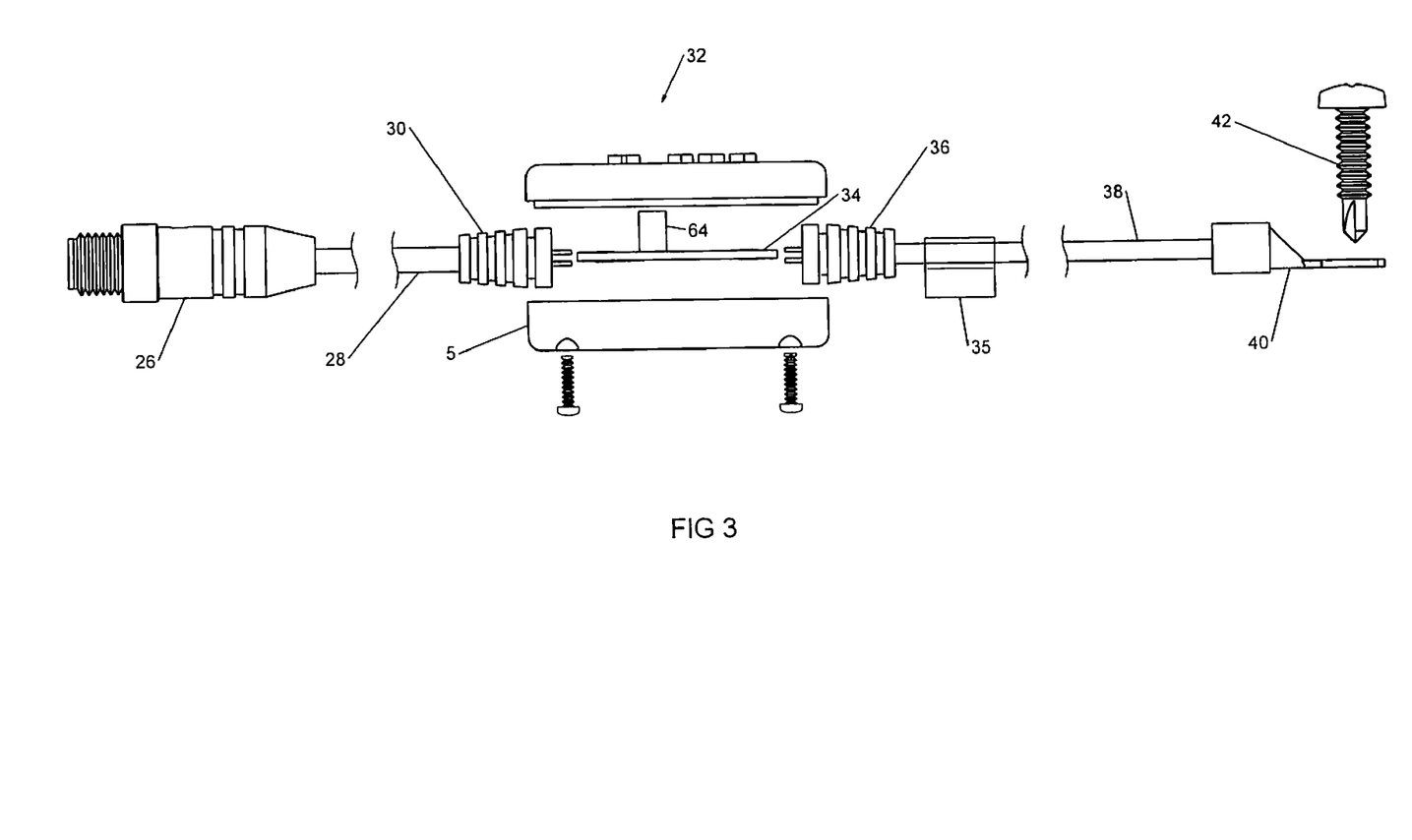
FIG. 3 is an exploded view of the sensor train of FIG. 2.
Figure 6:
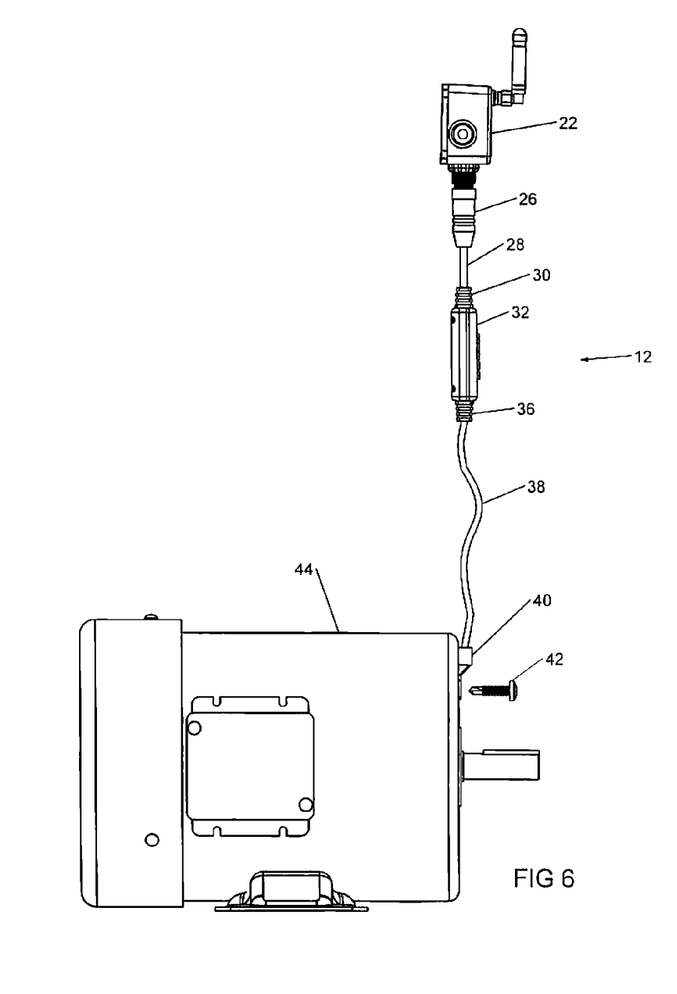
FIG. 6 is a representation of the sensor/transmitter of FIG. 2 secured to an electrical motor.

The sensor train portion 24 is shown in more detail in the exploded view of FIG. 3 and includes an 8 pin connector 26, a first flexible cable 28, a strain relief portion 30, a data Bus 32 (housing a V-Bus circuit board assembly 34), another strain relief portion 36, a second flexible cable 38, and a temperature probe 40. The self tapping screw 42 may be used to secure the temperature probe 40 to a device such as a motor 44 as shown in FIG. 6. Other fasteners or mounting hardware may be used to secure a sensor probe to a device being monitored. A label 35 (such as a Brady label) is secured to the flexible cable 38. This label 35 contains the unique identifying data for the sensor train portion 24, such as its serial number, which is also preprogrammed into the memory chip 54 found in the circuit board 34 as discussed in more detail below.

Figure 4A:
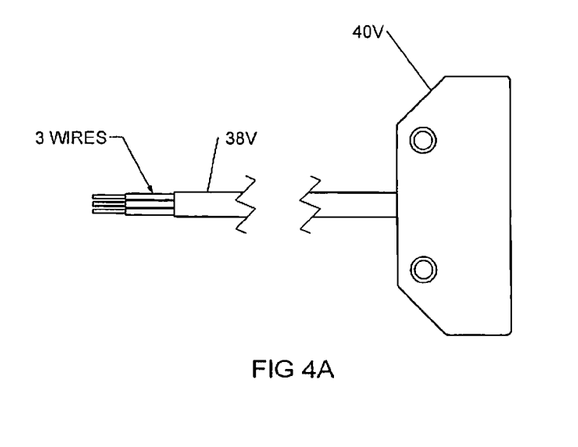
FIG. 4A is a vibration sensor probe.
Figure 4B:
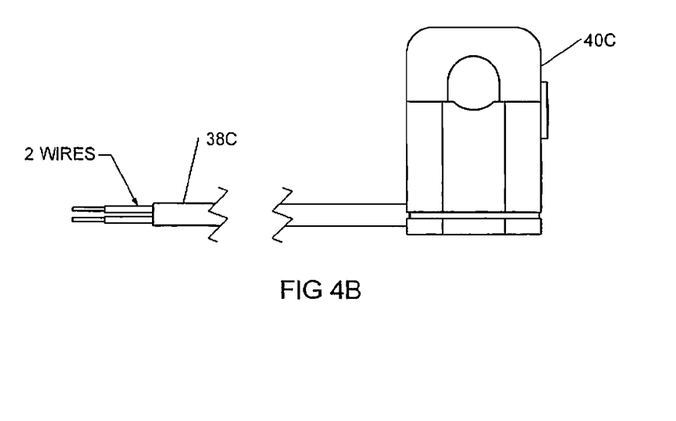
FIG. 4B is a current sensor probe.
Figure 4C:
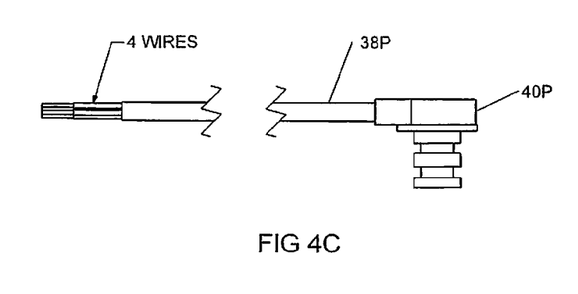
FIG. 4C is a pressure sensor probe.
Figure 4D:
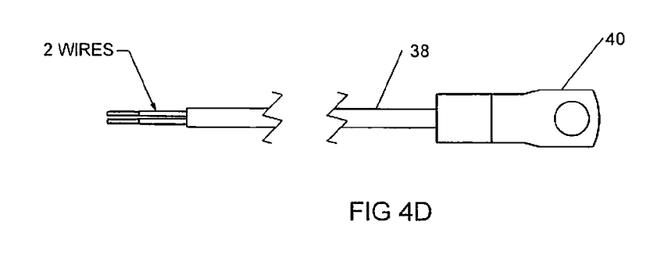
FIG. 4D is a temperature sensor probe.
Figure 4E:
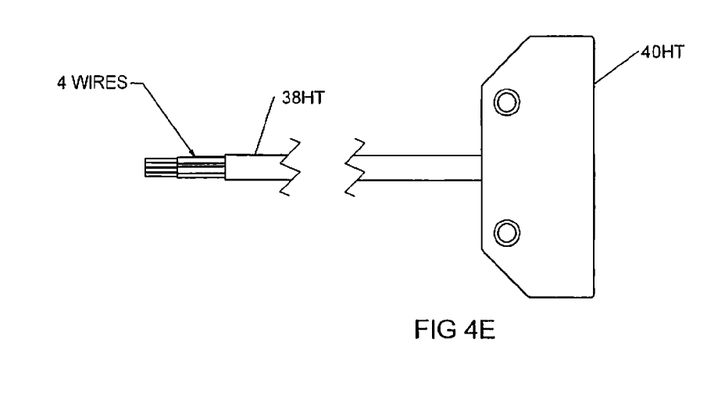
FIG. 4E is a humidity/temperature sensor probe.

FIG. 4D depicts the temperature probe 40 and its corresponding 2-wire cable 38, which connects the temperature probe 40 to the data Bus 32. FIGS. 4A, 4B, 4C, and 4E show other probes and their corresponding connecting cables which may be used instead of the temperature probe 40. For instance, FIG. 4A shows a vibration probe 40V and its corresponding 3-wire cable 38V. FIG. 4B shows a current probe 40C and its corresponding 2-wire cable 38C. FIG. 4C shows a pressure probe 40P and its corresponding 4-wire cable 38P. Finally, FIG. 4E shows a humidity/temperature probe 40HT and its corresponding 4-wire cable 38HT. Of course, other types of sensor probes may be used to monitor other physical parameters as well. For example, a sensor probe may be used to monitor contact switch closure (not shown).

As explained in more detail below, the sensor train (see FIG. 2) is a uniquely identifiable device. Its characteristics are dictated by the type of probe it incorporates, the wiring configuration within the circuit board 34 housed in the V-Bus 32, and the factory set preprogrammed information in the memory chip 54 (See FIG. 7) which is a component of the circuit board 34.

Figure 5:
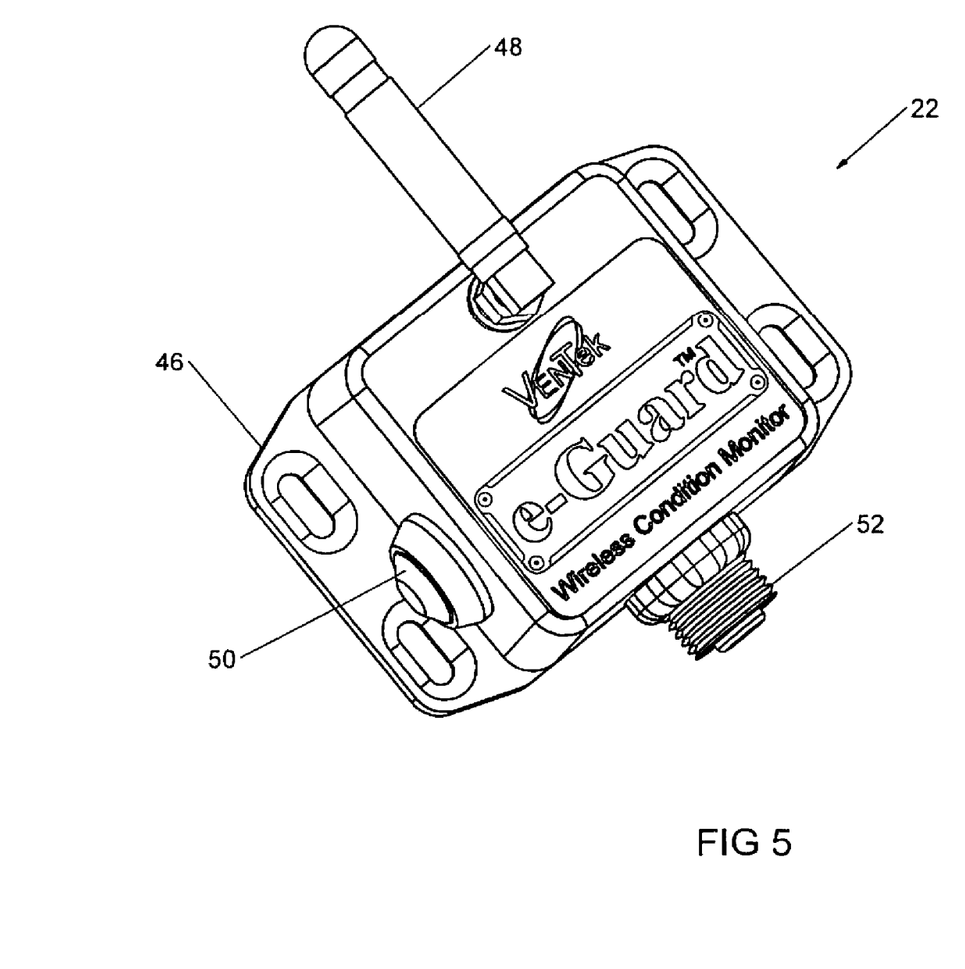
FIG. 5 is a perspective view of the radio frequency transmitter of FIG. 2.

FIG. 5 depicts the radio transmitter portion 22 of the sensor/transmitter 12. It has a back flange 46 for easy mounting to a flat surface such as a bracket (not shown). It includes a rubber coated monopole type antenna 48 with a weatherproof connection. A test/stamp button 50 can be used to initiate a sequence at the transmitter, causing it to poll the information from the sensor train and transmit it to the receiver. A threaded bulkhead connector 52 is provided to plug in the eight pin connector 26 of the sensor train portion 24. The radio transmitter portion 22 includes an internal power source (a half-size AA, 3.6 volt lithium battery in this embodiment) as well as the electronic circuitry of the radio transmitter which is well known in the industry, and a timing randomizer (as described in more detail below). When the connector 26 is plugged into the bulkhead connector 52, the transmitter portion 22 is automatically powered on. The sensor train portion 24 is parasitic in that it is powered by the battery in the radio transmitter portion 22 and does not carry its own power source.

This sensor/transmitter 12 is a transmitter only (it does not receive radio signals and thus is not a transceiver). A timing randomizer in the transmitter portion 22 automatically wakes up the transmitter portion 22 every 10 to 17 seconds to transmit data, after which the transmitter portion 22 falls back to sleep. The data transmitted by the sensor/transmitter 12 includes an error check algorithm, such as CRC-16, to ensure error free transmission of the data. This method of operation, with the transmitter using transmitting power only at very brief intervals, results in a battery life in the three year range, since the power consumption of the timing randomizer of the transmitter portion 22 is very low compared with the power consumption of the radio transmitter 22.

The radio transmitter 22 is transparent in that it provides no identifying features of its own. It acquires the identity of any sensor train 24 attached to it. This means that the sensor train 24 may be changed out without having to do any programming of the transmitter 22.

Figure 7:
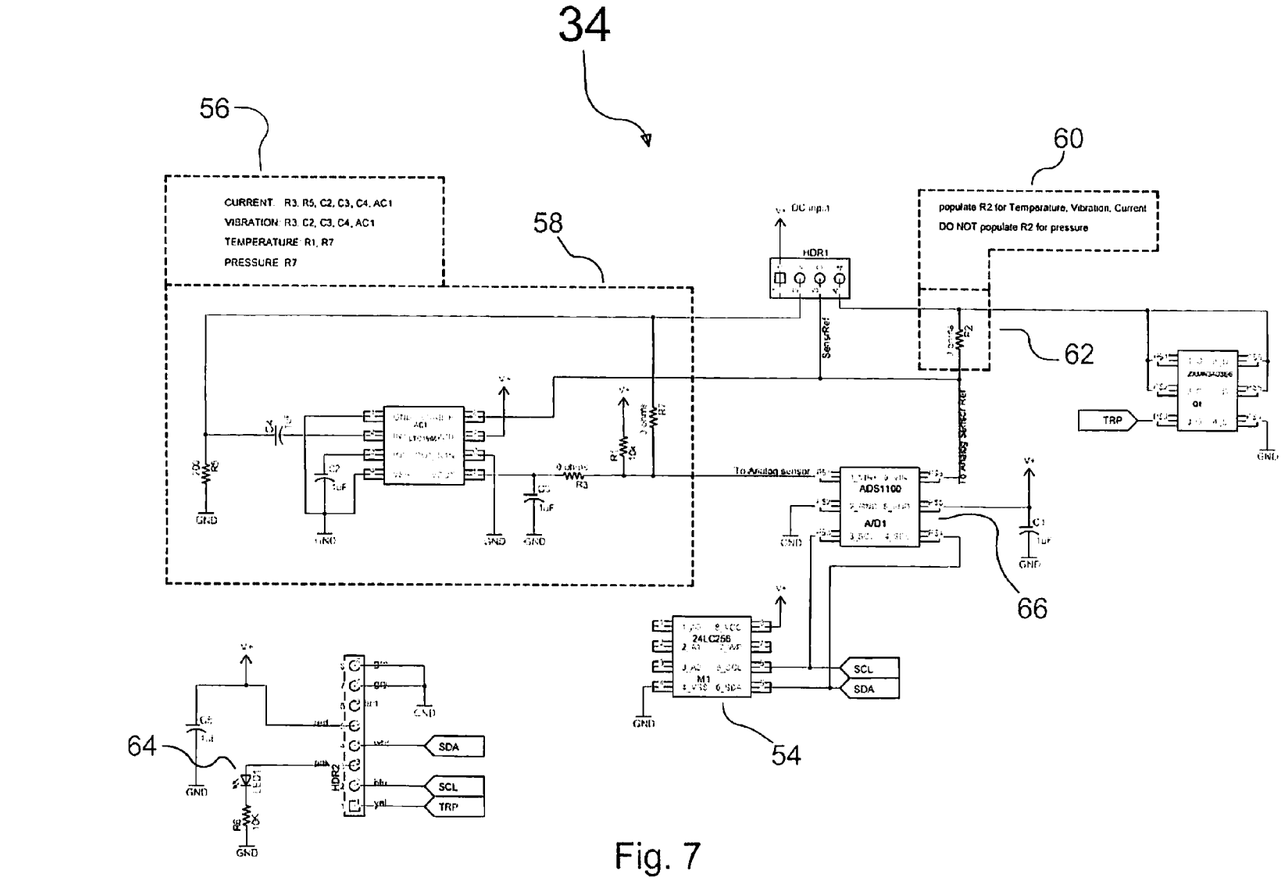
FIG. 7 is an electrical schematic diagram of the circuit board assembly of the sensor train of FIG. 3.

FIG. 7 is an electrical diagram of the circuit board assembly 34 of FIG. 3. The wiring configuration of the circuit board assembly 34 is customizable as required by the application. The block 56 indicates which electrical components are actually present within the block 58 for several different types of sensor probes. Similarly, the block 60 indicates whether the resistance R2 in block 62 is present, again depending on the type of sensor probe used. As is explained in more detail later, the circuit board assembly 34 conditions the incoming "raw" signal via an analog-to-digital converter 66 (A/D converter 66, see FIG. 7) so as to have a consistent 0-4,095 input value. Of course, other circuit board assemblies with different wiring configurations may be used to accomplish the same results.

The memory chip 54 is factory preprogrammed with the relevant unique identifying data for the sensor probe 24. Data which is preprogrammed into this memory chip 54 include a serial number, the type of sensor probe associated with this device (such as pressure, temperature, vibration, humidity, or current), calibration table(s), defined engineering unit(s) (such as degrees Fahrenheit, amps, pounds per square inch, etc.), and an error checking algorithm (such as CRC-16 error checking).

The circuit board assembly 34 includes a light emitting diode 64 (see FIGS. 2 and 3) which flashes when data is being transmitted. Communication is accomplished in an I²C serial protocol with processor to processor communication. As indicated earlier, the circuit board assembly 34, as well as the probe itself, is parasitically powered from a battery in the radio transmitter 22.

As discussed above, the circuit board assembly 34 includes the necessary wiring in order to convert AC type input signals to any equivalent DC value. This is used for converting the input from the vibration sensor and the current sensor, as both of these inputs are AC signals. This circuit also performs a time sample and gives an average with a single digital value based on the average RMS (root mean squared) conversion. This allows for a stable output which rises or falls based on the average vibration levels. For current, the sine wave is converted (RMS) to an equivalent DC value which allows for a single value that can be placed in a digital data packet.

Note that the memory chip 54 is a subcomponent of the circuit board 34. However, it should be understood that the V-Bus circuit board assembly 32 may also be referred to as the memory element of the 32 of the sensor train 24 (See FIG. 2) which, as indicated earlier, includes the sensor element 40, the memory element 32, the 8-pin connector 26, and the connectors 28, 38.

The sensor/transmitter 12 transmits data to the receiver 16 (See FIG. 1) which can be used to interface with Ethernet, serial, and direct signal interface (analog or discrete). The data can be displayed on a PC monitor, and it may be incorporated in an application program (software) which may monitor trends, may store and display historical data, and may provide alarm indications when appropriate.

Figure 12:
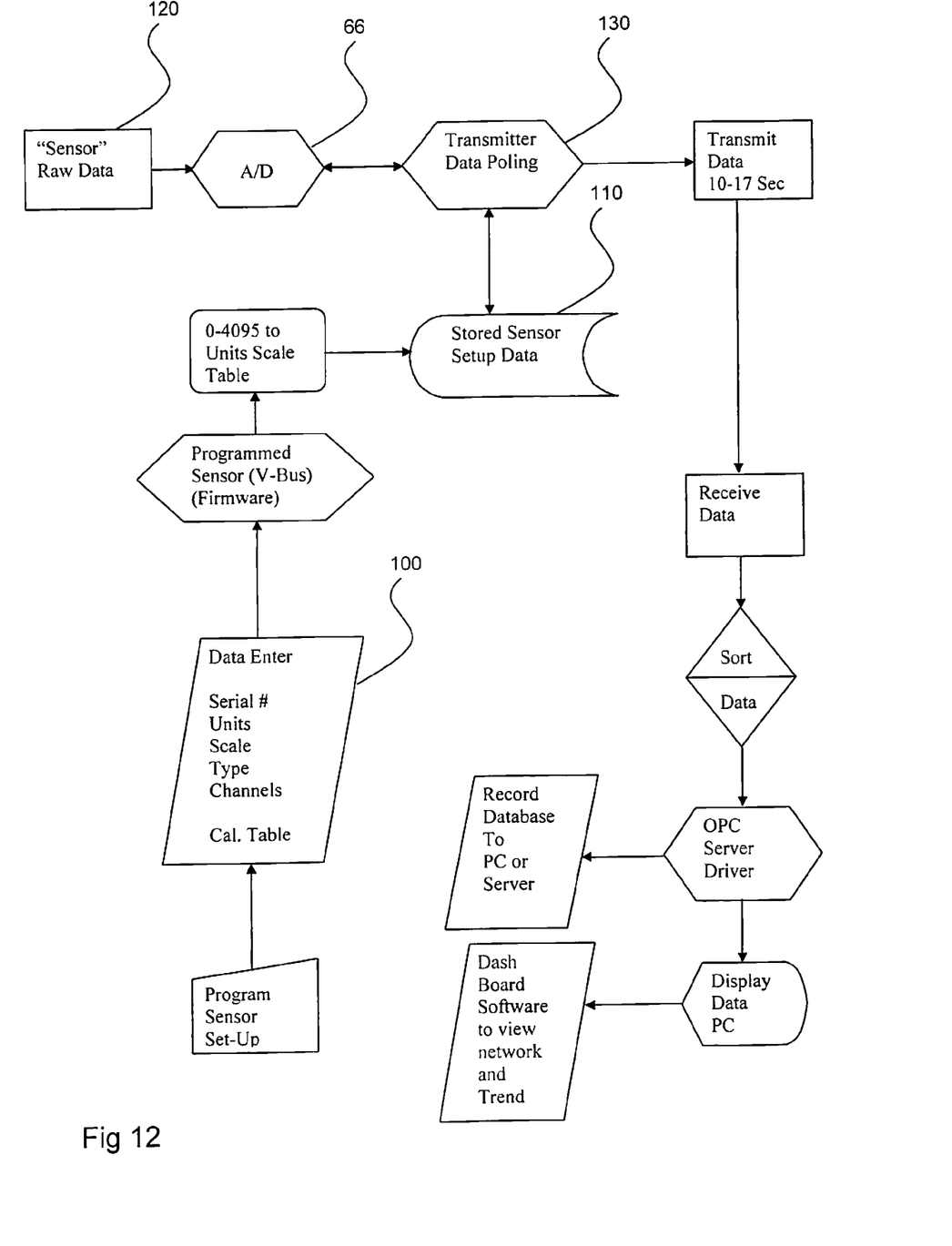
FIG. 12 is a flow chart showing the process involved in transmitting data from a sensor/transmitter.

Referring briefly to the flow chart diagram of FIG. 12, the lower left hand side of the diagram refers to what is preprogrammed into the memory chip 54. The data is entered at step 100, including a serial number which uniquely identifies the particular sensor, the units this sensor reads (such as amps for a current sensor 40C, see FIG. 4B), the scale (such as 0 to 100 amps), the type of sensor (in this instance a current sensor 40C), and a calibration table which specifically correlates a numerical value between 0 and 4,095 to a reading (for instance, in this example, a reading of 0 could correlate to 0 amps and a reading of 4,095 could correlate to 100 amps). The correlation may be a linear relation (wherein, for instance, a reading of 2,047.5 would correlate to 50 amps) or it may be non-linear, dictated by an equation or by some other function. All this information is stored in the Stored Sensor Setup Data 110.

On the top left side of the flow chart diagram of FIG. 12 (at block 120), the sensor reads raw data from the environment and this value (which can be, for instance, a ratiometric millivolt reading, or a 0 to 5 volt reading) is converted in the Analog-to-Digital converter 66 to a 04,095 reading. When the memory chip 54 is "awakened" by the timing randomizer in the transmitter portion 22, it polls the data from the sensor and picks up this converted 0-4,095 reading (at block 130). It then compares it with the Stored Sensor Setup Data (at block 110) to correlate the reading to an actual value including the correct units of measure, and transmits the entire set of information (that is, the serial number, the actual value, the units of measure, the type of sensor, and the calibration table) to the receiver and on to a processor to sort the data and assign the value to a particular sensor or device.

The units and calibration table data may be such that a sensor (such as the pressure sensor 40P) may be used to read directly some other parameter which is related to the monitored parameter. For instance, a pressure sensor 40P may be installed in the bottom of a tank to read the pressure exerted by a column of water. The sensor, with a range of 4-20 millivolts, may send a reading of 10 millivolts to the Analog-to-Digital converter 66 which converts this to a value of say 1,536. When this value is compared to the data in the memory chip 54, it can be converted directly into a height, in inches of water, of the water column corresponding to the reading. If the scale is, for example, 0 to 10 feet (0 to 120 inches), then the reading, if linear, could correspond to a height of the water column of 45 inches, and this information would be transmitted directly (that is, an actual reading of 45 inches in a scale of 0 to 120 inches of water column height, with measurement units in inches and the sensor type being a level sensor). All this conversion and correlation is done at the sensor train 24 and is transmitted as such to the receiver and the processor.

Figure 8:
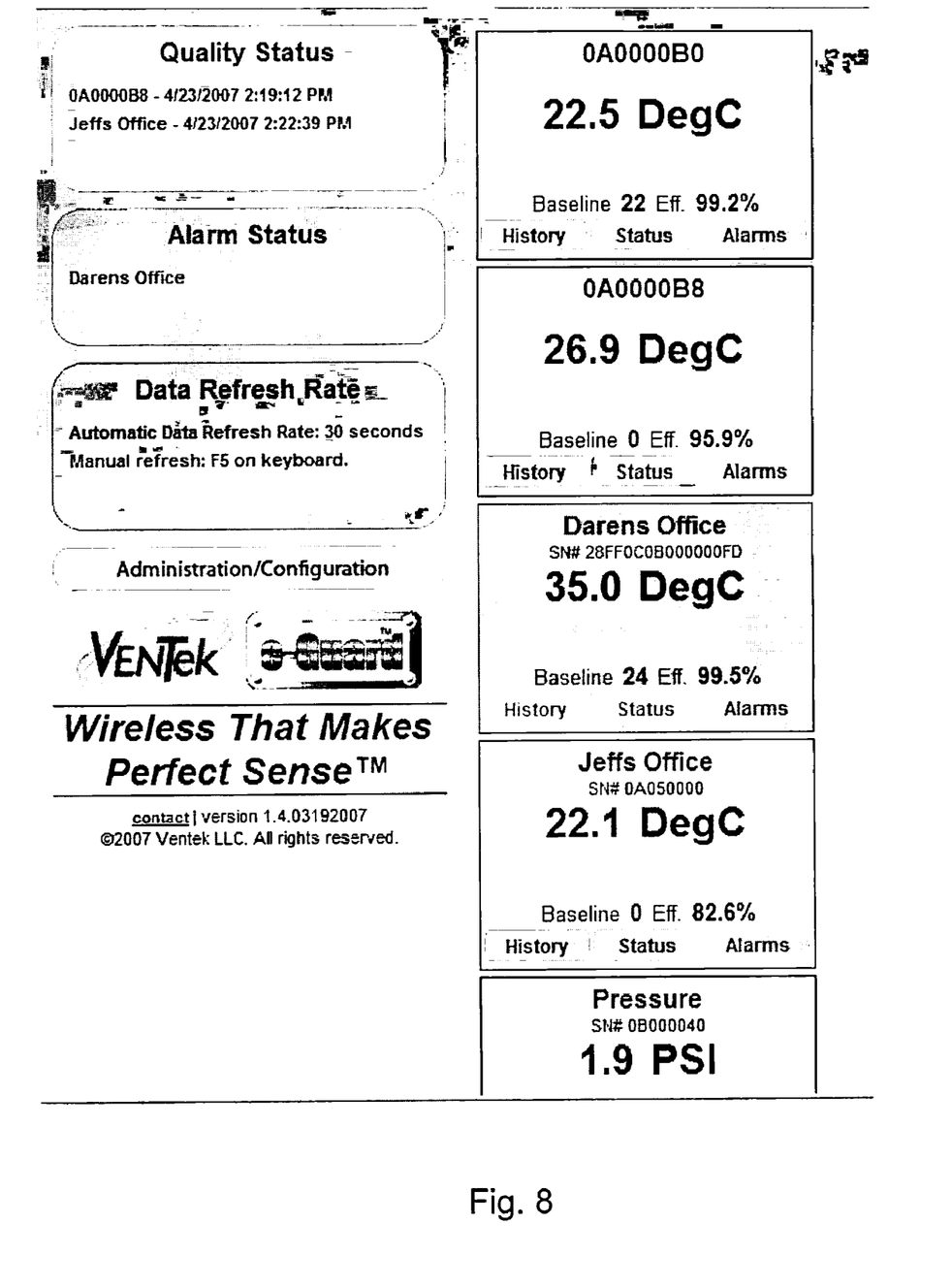
FIG. 8 is a view of the "home" page of a data management software program which may be used to manage the data transmitted by the sensor/transmitters of FIG. 1.
Figure 9:
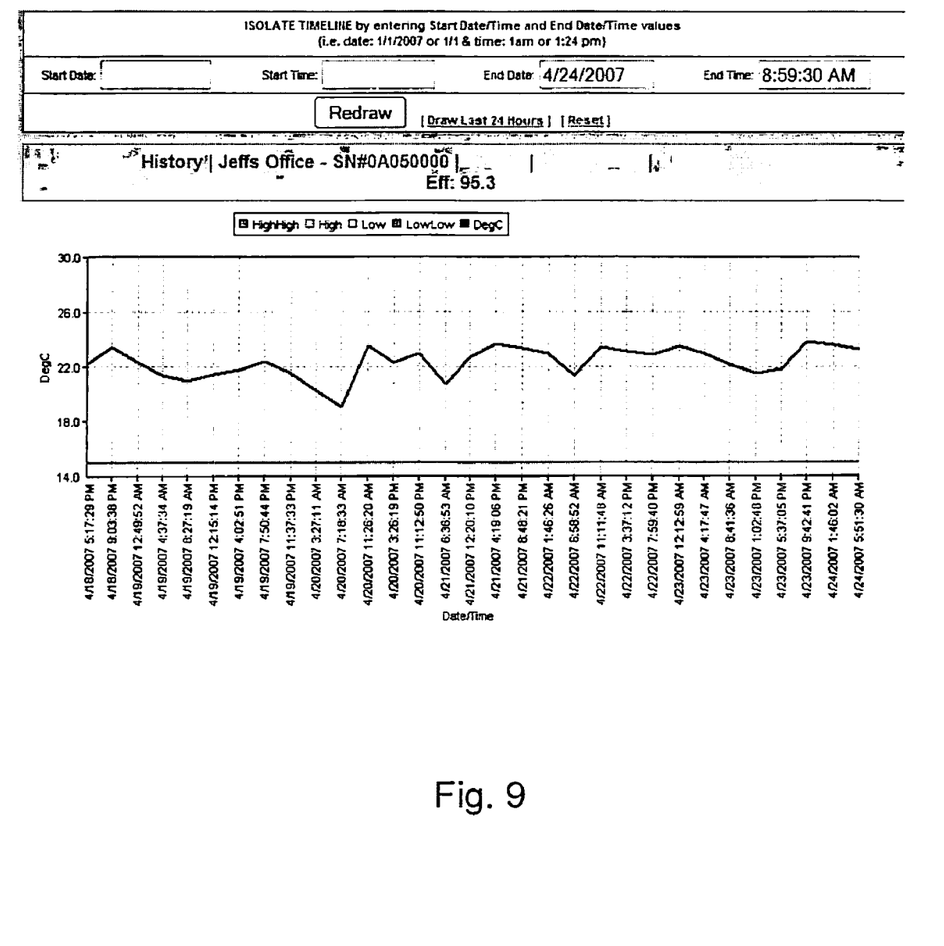
FIG. 9 is a view of the "History" page which is hyperlinked to an individual sensor/transmitter in the "home" page of FIG. 8.
Figure 10:
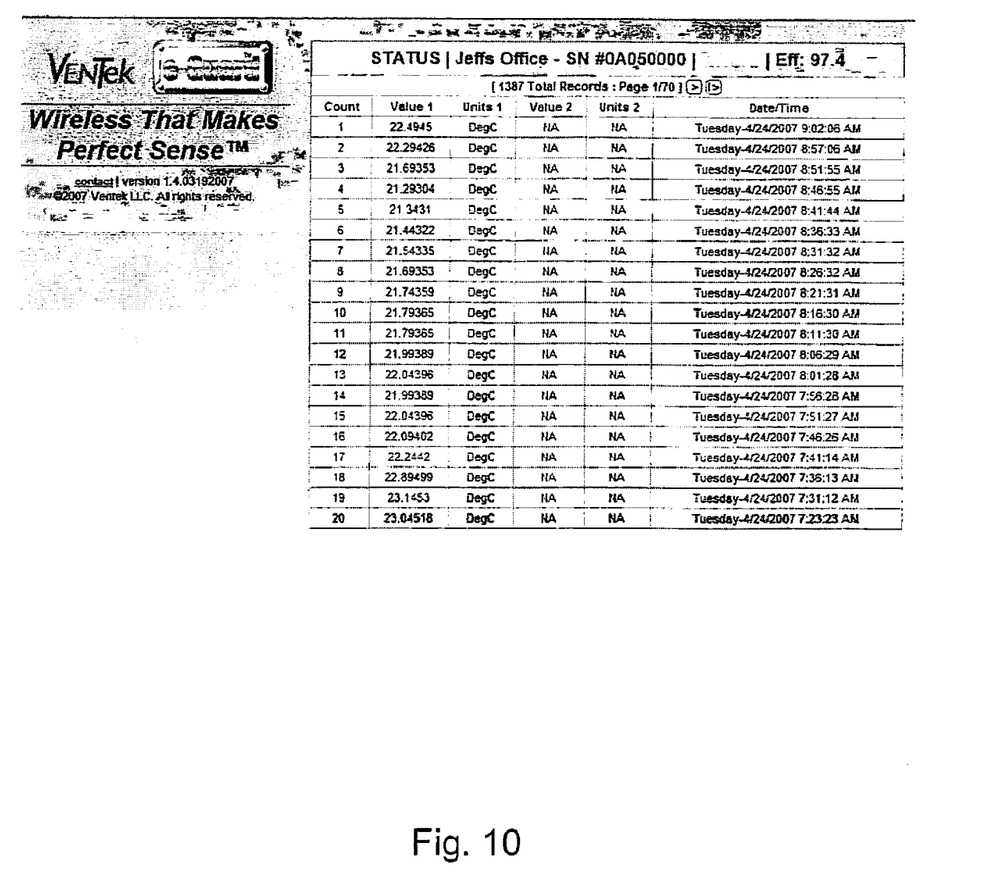
FIG. 10 is a view of the "Status" page which is hyperlinked to an individual sensor/transmitter in the "home" page of FIG. 8.
Figure 11:
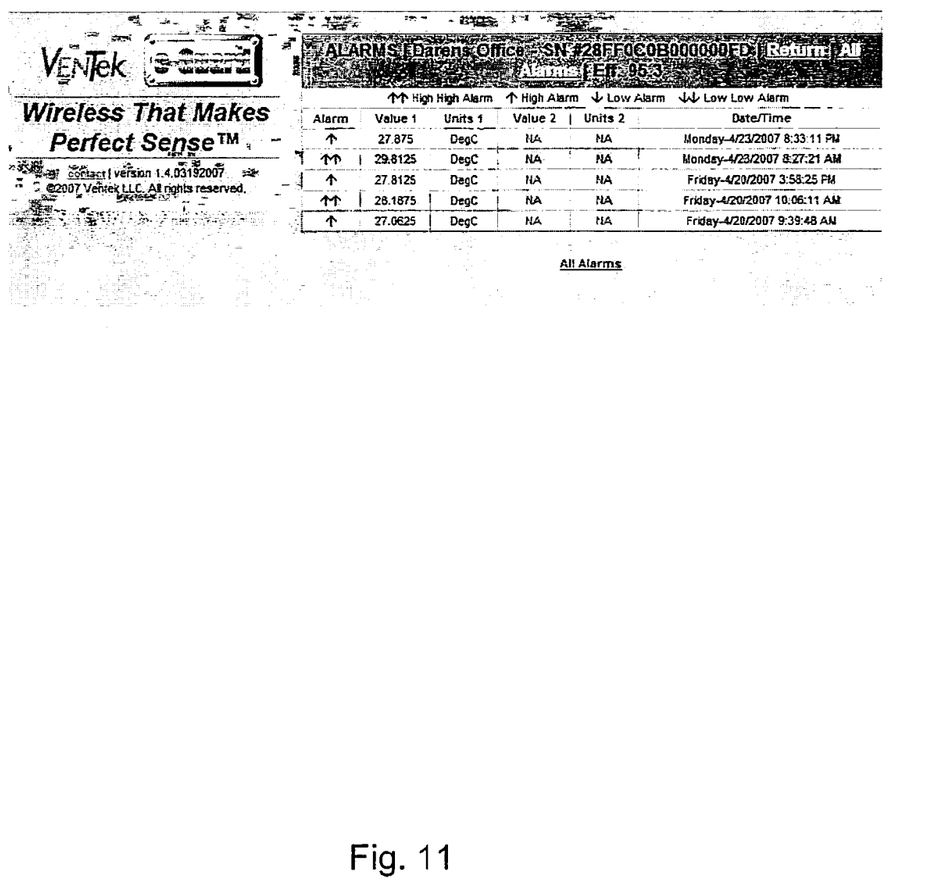
FIG. 11 is a view of the "Alarms" page which is hyperlinked to an individual sensor/transmitter in the "home" page of FIG. 8.

FIGS. 8-11 depict typical pages of a data management software program which may be used to manage the data sent by the sensor/transmitters 12. FIG. 8 is the "home" page which highlights the different sensor/transmitters 12 installed, and which includes hyperlinks to the "history" page (see FIG. 9), the "status" page (see FIG. 10), and the "alarms" page (see FIG. 11) for each of those sensor/transmitters 12. Also included in the home page are links to those sensor/transmitters 12 which are in red alarm condition, as well as links to those sensor/transmitters 12 which are in yellow "lost communication" condition. This "lost communication" condition can be as a result of a dead battery (dead power supply) or because that particular sensor/transmitter 12 is out of service.

In a basic setup process, a maintenance technician would follow the following procedure:

1) Install a sensor train 24 to monitor one of the desired performance parameters (such as temperature, pressure, vibration, current, humidity, or contact switch closure) of a device or environment. For instance, a temperature sensor 40, which is part of a sensor train 24, could be secured to the housing of an electric motor 44 as shown in FIG. 6.

2) The radio transmitter portion 22 is then positioned within a 2 foot radius (the standard length of the cables 28, 38) or as required for the application (custom length) of the device 44 being monitored, and the sensor train 24 is then plugged into the radio transmitter 22, and, in this embodiment, is secured by a threaded connection.

3) A receiver 16 is mounted within a 600 foot range of the radio transmitter 22. If the receiver 16 is beyond this standard 600 foot range of the radio transmitter 22, a repeater 14 may be installed to increase the transmission range to approximately 1 mile.

4) The receiver 16 is then connected to a network system via Ethernet or via a serial connection.

5) Appropriate application software, such as OPC (Object linking and embedding for Process Control) Software may be installed on a host Computer System, allowing storage and access to the network data.

6) The technician then enables the network and configures all of the installed sensor/transmitters 12. This can be readily accomplished by putting the software program in the host computer in the "add sensor to network list" mode and depressing the test/stamp button 50 in the transmitter 22. That particular sensor/transmitter 12 is automatically recognized and added to the network. The technician may correlate the particular sensor to a particular device (such as the motor 44, for instance). At this point, the monitoring system is ready to interface with any Windows-based host software.

The software then monitors the data transmitted by the sensor/transmitters 12 and may use that information for various purposes, such as scheduling maintenance. For example, in the case of this temperature sensor, the software may compare the temperature readings to a standard, and, if the motor 44 overheats, the software would recognize that the temperature of the motor has exceeded its maximum acceptable operating temperature and would activate an alarm. Or, the software may note that the temperature of the motor is gradually increasing and may schedule maintenance of the motor before it exceeds its maximum acceptable operating temperature. Various data received from the sensor/transmitters 12 may be used in various ways, as is known in the art.

It will be obvious to those skilled in the art that modifications may be made to the embodiments described above without departing from the scope of the present invention.

What is claimed is:

1. A device for a wireless monitoring system, comprising:
   a sensor train including
      a sensor element;
      a memory element electrically connected to said sensor element, said memory element storing data including a unique identifier for said sensor element, data defining the type of sensor element, and data defining the engineering units for the output from said sensor element; and
      an external connector for connecting said sensor element and said memory element to a port on an external transmitter.

2. A device for a wireless monitoring system as recited in claim 1, wherein the data stored in said memory element further includes a calibration table and an error check algorithm.

3. A device for a wireless monitoring system as recited in claim 1, wherein said sensor train includes a circuit board with a plurality of wiring configurations for a plurality of types of sensor elements, and wherein the wiring configuration that matches said sensor element is selected.

4. A device for a wireless monitoring system as recited in claim 3, and further comprising a transmitter, including a transmitter housing, wherein said transmitter includes a mating external connector element which is mated with said external connector of said sensor train.

5. A device for a wireless monitoring system as recited in claim 4, wherein said transmitter includes an internal power source; internal radio frequency transmission electronics; and an antenna; and wherein said internal power source provides the power for said sensor train.

6. A device for a wireless monitoring system as recited in claim 5, wherein said sensor is a temperature sensor.

7. A device for a wireless monitoring system as recited in claim 5, wherein said sensor is a pressure sensor.

8. A device for a wireless monitoring system as recited in claim 5, wherein said sensor is a vibration sensor.

9. A method for wireless remote sensing, comprising the steps of:
   providing a sensor train, including a sensor element and a memory element programmed for use with said sensor element, including a unique identifier, data defining the type of sensor, and the type of engineering units measured by the sensor element; and then electrically connecting the programmed sensor train to a transmitter.

10. A method for wireless remote sensing as recited in claim 9, wherein connecting said sensor train to the transmitter is achieved by connecting a single external connector on the sensor train to a corresponding external connector on the transmitter.

11. A method for wireless remote sensing as recited in claim 10, and further comprising the step of converting data received from said sensor element from analog to digital format in said memory element, and correlating said converted digital data to a value from a calibration table in said memory element.

12. A method for wireless remote sensing as recited in claim 11, and further comprising the steps of waking the transmitter for brief intervals, during which the transmitter polls the sensor and transmits data.

13. A method for wireless remote sensing as recited in claim 12, and further comprising the steps of:
receiving data from said transmitter at a receiver, said data including the unique identifier, the type of sensor, the engineering units of the output from the sensor, and a sensed parameter; and processing the data received by the receiver to recognize the unique sensor that is generating the sensed parameter and the sensed parameter being transmitted, including the engineering units of the sensed parameter.

14. A method for wireless remote sensing as recited in claim 13, and further comprising the steps of:
depressing a button on the transmitter to send a signal to the receiver; and programming a processor that is in communication with the receiver to identify the piece of equipment which correlates to the unique identifier being transmitted by the transmitter.

15. A method for wireless remote sensing as recited in claim 14, including the step of transmitting an error algorithm via the transmitter, which enables the processor to know that it has received the correct data from the transmitter without having to communicate back to the transmitter.

* * * * *